W. V. TURNER.
LOCOMOTIVE BRAKE EQUIPMENT.
APPLICATION FILED OCT. 28, 1918.
1,316,208.
Patented Sept. 16, 1919.
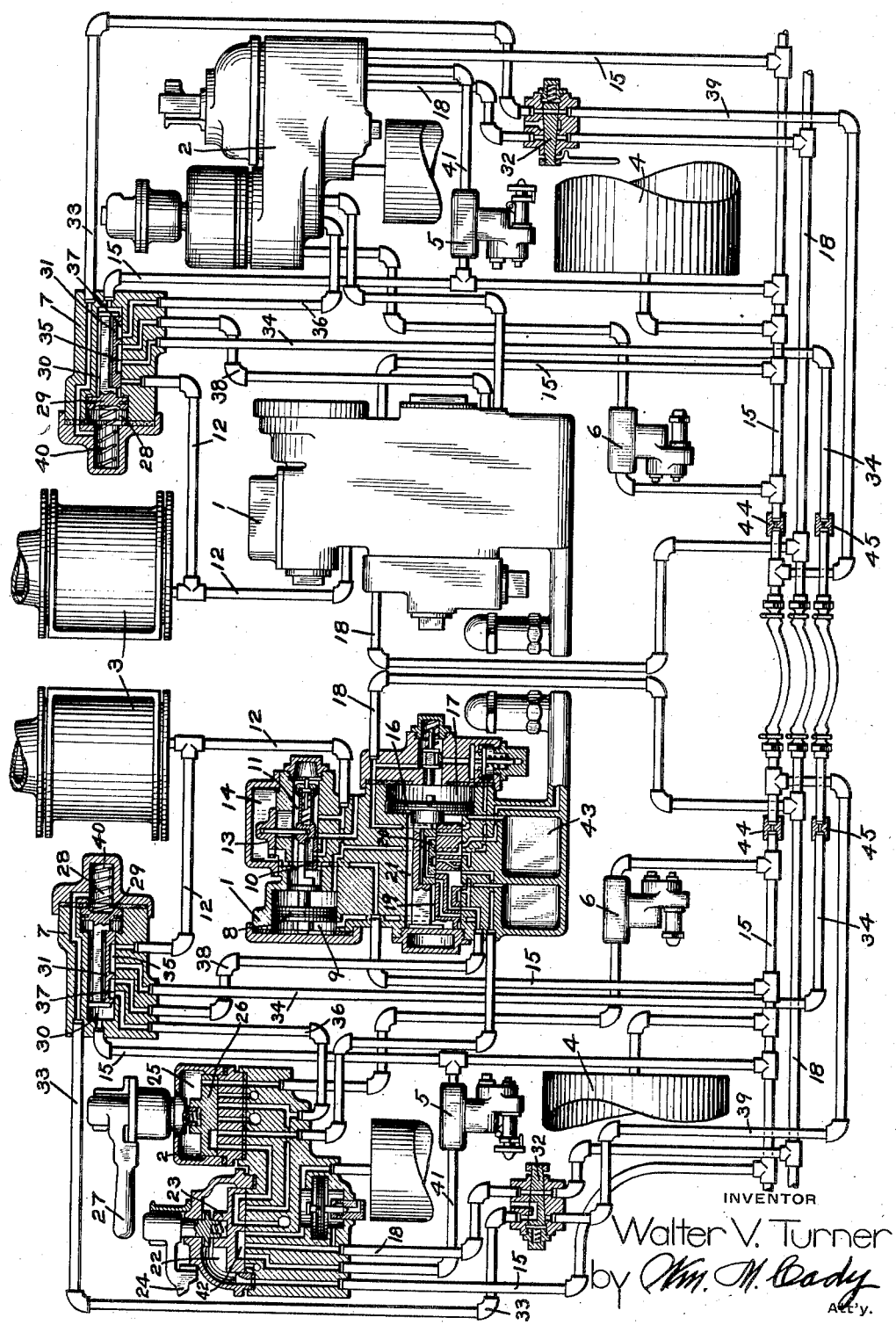
INVENTOR
Walter V. Turner
by Wm. N. Cady
Att'y.

UNITED STATES PATENT OFFICE.

WALTER V. TURNER, OF WILKINSBURG, PENNSYLVANIA, ASSIGNOR TO THE WESTINGHOUSE AIR BRAKE COMPANY, OF WILMERDING, PENNSYLVANIA, A CORPORATION OF PENNSYLVANIA.

LOCOMOTIVE BRAKE EQUIPMENT.

1,316,208.        Specification of Letters Patent.    Patented Sept. 16, 1919.

Application filed October 28, 1918. Serial No. 259,894.

*To all whom it may concern:*

Be it known that I, WALTER V. TURNER, a citizen of the United States, residing at Wilkinsburg, in the county of Allegheny and State of Pennsylvania, have invented new and useful Improvements in Locomotive Brake Equipments, of which the following is a specification.

This invention relates to fluid pressure brakes, and more particularly to a locomotive brake equipment.

It has heretofore been proposed to provide a locomotive brake equipment in which the brakes can either be controlled automatically, by varying the brake pipe pressure, or independently, by straight air control.

In some cases, for example, on long electric locomotives, it is considered necessary to provide a locomotive brake equipment at each end of the locomotive, and in such cases, when the brakes are operated by straight air control, the brake equipments at opposite ends of the locomotive being a considerable distance apart, there is not that promptness in applying and releasing the brakes, which is desired.

The principal object of my invention is to provide means for securing the prompt application and release of the brakes where the brakes are controlled by straight air.

In the accompanying drawing, the single figure is a view, partly in section, of a double end locomotive brake equipment, with my invention applied thereto.

As shown in the drawing, the apparatus may consist of a locomotive brake equipment at each end of the locomotive, each equipment comprising a distributing valve device 1, a combined automatic and independent brake valve device 2, a brake cylinder 3, a main reservoir 4, a feed valve device 5, a reducing valve device 6, and according to my invention, a transfer valve device 7.

The distributing valve device 1 may consist of a casing containing the usual application and release portion and the equalizing valve device portion, the application and release portion comprising a piston 8 contained in piston chamber 9, a release valve 10, contained in valve chamber 11, connected by pipe 12 to brake cylinder 3, and an application valve 13, contained in valve chamber 14, which is supplied, through pipe 15, with fluid under pressure from the main reservoir 4.

The equalizing valve device portion comprises a piston 16, contained in piston chamber 17, connected to brake pipe 18, and main slide valve 19 and auxiliary slide valve 20, contained in valve chamber 21 and adapted to be operated by piston 16.

The combined automatic and independent brake valve device 2 may comprise a casing having a valve chamber 22, containing rotary valve 23 for controlling the brakes automatically by operation of handle 24 and a valve chamber 25, containing a rotary valve 26 for controlling the brakes by straight air by operation of the handle 27.

The transfer valve device 7 may comprise a casing having a piston chamber 28, containing a piston 29 and a valve chamber 30, connected to main reservoir pipe 15 and containing a slide valve 31 adapted to be operated by piston 29.

In operation, the cut-out cock 32 at the operating end of the locomotive is turned to its open position, as shown at the left hand side of the drawing, and in which a pipe 33, leading to piston chamber 28 of the transfer valve device 7 is opened to the atmosphere. Main reservoir pressure, acting in valve chamber 30, then shifts the piston 29 to its outer position, in which the valve 31 connects an equalizing pipe 34, through cavity 35, with brake cylinder pipe 12, and also connects pipe 36, leading to the independent brake valve, through cavity 37, with pipe 38, leading to the application piston chamber 9.

At the non-operating end of the locomotive, as shown at the right hand end of the drawing, the cut-out cock 32 is turned to its closed position, in which the pipe 33 is connected to a pipe 39, leading to main reservoir pipe 15, so that fluid from the main reservoir is supplied to the piston chamber 28 of the transfer valve device at the non-operating end, permitting the spring 40 to shift piston 29 to its inner position, in which the equalizing pipe 34 is connected by cavity 35 with pipe 38 and the pipe 36 from the independent brake valve is blanked With the automatic brake valve handle in running position, as shown at the left of the drawing, fluid is supplied from the feed valve device 5, through pipe 41 and cavity 42 in the rotary valve 23, to brake pipe 18, charging the brake pipe and the piston chamber 17 of each distributing valve 1.

Fluid flows from the piston chamber 17 through a feed groove around piston 16 to valve chamber 21 and pressure chamber 43, charging same in the usual manner.

In order to effect an independent straight air controlled application of the brakes on the locomotive, the independent brake valve handle 27 is turned to application position, in which fluid is supplied through the reducing valve device 6 to pipe 36 and thence through cavity 37 of the slide valve 31 to pipe 38.

The application piston chamber 9 of the distributing valve device 1 at the operating end being thus supplied with fluid under pressure, the piston 8 is operated to open the application valve 13 and admit fluid from the main reservoir to the brake cylinder.

Fluid supplied to the brake cylinder at the operating end also flows through cavity 35 of the transfer valve device 7 to the equalizing pipe 34 and thence through cavity 35 of the transfer valve device at the non-operating end to the pipe 38, so that the application piston chamber 9 of the distributing valve device at the non-operating end is also supplied with fluid under pressure.

The application piston 8 of this distributing valve device is therefore operated to open the corresponding application valve 13 and supply fluid from the main reservoir to the brake cylinder at the non-operating end of the locomotive.

As is well known, the application piston of the distributing valve being subject to the opposing pressures of the brake cylinder and the application piston chamber, the pressure in the brake cylinder is automatically maintained against leakage at a pressure corresponding with the pressure supplied to the application piston chamber, and since the port opening of the application valve 13 is of ample capacity, and is supplied with fluid directly from the main reservoir, an independent application of the brakes can be secured promptly at both ends of the locomotive, regardless of its length and of the size and number of brake cylinders which are to be supplied. It will thus be evident that with my invention, the independent brake valve may be of ordinary size and the supply port therein may be of the same capacity for any equipment, regardless of the number and size of the brake cylinders and of the distance which separates the locomotive brake equipments at opposite ends of the locomotive.

This is an important consideration, for if the independent brake valve is provided with supply ports large enough to take care of more than one brake equipment, then when employed in unit or single equipment operation, the ports would be too large to give the desired fine graduated operation in applying the brakes by straight air operation.

The independent release of the brakes is effected in the usual manner, by turning the independent brake valve handle 27 to release position, in which fluid is vented from the application piston chamber of the distributing valve device 1.

The release of the brakes at the operating end of the locomotive also causes the prompt release at the non-operating end, since fluid is released from the application piston chamber of the distributing valve device at the non-operating end through the release valve of the distributing valve device at the operating end.

It will thus be seen that in releasing, as well as in applying the brakes, a prompt response is secured, since the independent brake valve only has to release fluid from a short length of pipe leading to the corresponding distributing valve device, while the large release ports of the distributing valve are utilized to quickly exhaust fluid from the piping leading to the application piston chamber of the distributing valve device at the non-operating end.

The operation of the apparatus will be the same, if the operator is stationed at the opposite end of the locomotive, the positions of the transfer valves 7 and the cut-out cocks 32 being reversed.

A choke 44 may be interposed in the main reservoir pipe 15, so as to prevent undue loss of fluid from the main reservoir in case of a parted hose connection, or the like.

The equalizing pipe 39 is connected to the main reservoir pipe 15 at the side of the choke 44, remote from the main reservoir, so that the piston 39 of the transfer valve device 7 at the non-operating end of the locomotive will be shifted to its outer position, upon a reduction in pressure in the pipe 39, due to a parted hose connection, and thus permit the brakes to be controlled by the brake valve at the non-operating end.

A choke 45 may be interposed in the equalizing pipe 34 to prevent loss of pressure in the brake cylinder, in case of a ruptured hose connection, or if the piping should develop a break.

If the equalizing pipe at the operating end of the locomotive should break, the brakes may be operated from the other end of the locomotive.

The automatic control of the brakes is the same as heretofore with the type of locomotive brake equipment shown, and since this operation is well understood, the same need not be further described herein.

However, in automatic service and emergency braking, since the application piston chamber of the distributing valve device at the non-operating end of the locomotive is in direct communication with the brake cylinder at the operating end, a supplementary medium is provided to facilitate the prompt response of the distributing valve device at the non-operating end, when the brakes are controlled automatically.

Having now described my invention, what I claim as new, and desire to secure by Letters Patent is:—

1. In a locomotive brake, the combination with a brake cylinder and a brake equipment at each end of the locomotive adapted to be controlled by straight air for varying the pressure in the brake cylinder, of means for establishing communication from the brake cylinder at one end of the locomotive to the brake equipment at the other end for operating said brake equipment.

2. In a locomotive brake equipment, the combination with a brake cylinder and a distributing valve device at each end of the locomotive comprising valve means for varying the pressure in the brake cylinder and a piston subject to the pressure in an application chamber for operating said valve means, of a valve device at each end of the locomotive for connecting the brake cylinder at one end to the application chamber of the distributing valve device at the other end of the locomotive.

3. In a fluid pressure brake, the combination with a plurality of brake cylinders, a corresponding brake application valve device having a brake application piston subject to the opposing pressures of the application piston chamber and the corresponding brake cylinder for controlling the supply of fluid to the brake cylinders, of a transfer valve device associated with each brake application valve device and having positions for connecting either the brake cylinder or the application piston chamber to a common pipe.

4. In a fluid pressure brake, the combination with a plurality of brake cylinders, a corresponding brake application valve device having a brake application piston subject to the opposing pressures of the application piston chamber and the corresponding brake cylinder for controlling the supply of fluid to the brake cylinders, of a transfer valve device associated with each brake application valve device and having positions for connecting either the brake cylinder or the application piston chamber to a common pipe and a valve for varying the fluid pressure on each transfer valve device to thereby effect the movement of the transfer valve device to either position.

5. In a fluid pressure brake, the combination with a brake equipment at opposite ends of a locomotive, comprising a brake cylinder and an application valve device having a piston operated by variations in pressure in the opposite piston chamber for supplying fluid to the brake cylinder, of a transfer valve device associated with each brake equipment, an equalizing pipe, and means for shifting said transfer valve devices to connect the brake cylinder at one end and the application piston chamber at the other end with said equalizing pipe.

6. In a locomotive brake, the combination with a brake cylinder at each end of the locomotive and a corresponding distributing valve device operated by variations in pressure in an application chamber for varying the pressure in the brake cylinder, of a brake valve device, a common pipe, and a transfer valve device at each end of the locomotive, having one position for connecting the brake valve device to the application chamber of the corresponding distributing valve device and the brake cylinder with the common pipe and another position for cutting off communication from the brake valve device to the application chamber and for connecting the common pipe with the application chamber.

In testimony whereof I have hereunto set my hand.

WALTER V. TURNER.